United States Patent
Vines et al.

Patent Number: 5,811,529
Date of Patent: Sep. 22, 1998

[54] BIS-PYRIDONE COMPOUNDS

[75] Inventors: Danette R. Vines, Charlotte, N.C.; Ronald P. Pedemonte, Eppstein-Vockenhausen, Germany

[73] Assignee: Dystar, L.P., Charlotte, N.C.

[21] Appl. No.: 816,758

[22] Filed: Mar. 7, 1997

[51] Int. Cl.$^6$ .................................................. C07C 245/06
[52] U.S. Cl. .......................................... 534/560; 534/561
[58] Field of Search .............................. 534/614, 560.561

[56] References Cited

U.S. PATENT DOCUMENTS

| | | | |
|---|---|---|---|
| 3,994,906 | 11/1976 | Hegar | 260/294 |
| 4,243,809 | 1/1981 | Seitz | 546/291 |
| 4,618,671 | 10/1986 | Kayane et al. | 534/635 |

*Primary Examiner*—Zinna Northington Davis
*Attorney, Agent, or Firm*—Connolly & Hutz

[57] ABSTRACT

A fiber reactive dye having the formula

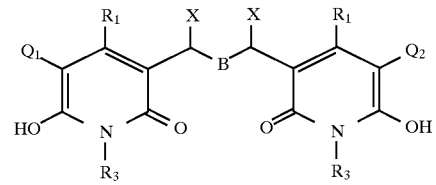

wherein $R_1$ and $R_3$ are independently selected from the group consisting of; hydrogen; an alkyl group having from one to four carbon atoms; the foregoing alkyl group further substituted with one or more groups selected from hydroxy; amino; sulfo; halogen; an aryl radical; a heterocyclic radical or combination thereof; where for $R_3$ said amino group maybe further substituted by a nitrogen heterocyclic fiber reactive group of the series: 1, 3, 5 mono or dichloro triazinyl; 1, 3, 5 mono or difluoro triazinyl; trichloropyrimidinyl; difluoropyrimidinyl; or monochlorodifluoro pyrimidinyl; where the nitrogen heterocycle may be further substituted by an: alkyl; or aryl amino group;

wherein B is selected from the group consisting of a $C_2$ to $C_4$ alkyl chain; a substituted aryl or a heterocyclic radical;

wherein X is selected from the group consisting of $SO_3H$; $SO_3Na$ or a hydroxy group; and wherein $Q_1$ and $Q_2$ are independently selected from diazo components.

8 Claims, No Drawings

BIS-PYRIDONE COMPOUNDS

FIELD OF THE INVENTION

The present invention is directed to bis-pyridone compounds and a method of preparation of the bis-pyridone compounds. The bis-pyridone compounds are useful in the preparation of fiber reactive dyes and as a component of fiber reactive dyes.

BACKGROUND OF THE INVENTION

Fiber reactive dyes form a chemical bond with the fiber being colored, and because of this are generally considered to possess excellent fastness properties. The largest class of fiber reactive dyes are diazo dyes, i.e., those containing one or more azo groups (N=N). Fiber reactive dyes containing one azo group are referred to as monoazo fiber reactive dyes, those containing two azo groups are disazo fiber reactive, and so on. The fiber reactive azo dyes are generally prepared by the chemical reaction, between a diazo component and a coupling component, referred to as a coupling reaction. The fiber reactive dyes are useful for the dyeing and printing of cellulosic materials such as cotton, linen, or rayon (e.g. viscose rayon) fibers. They may also be used on wool, silk, or polyamide fibers.

Reactive dyes require from 1–4 water-solubilizing groups, such as the sulfonic acid moiety, in order to be soluble. Solubility is important in reactive dyes because reactive dye processes involves the distribution of the dyes which are water soluble between two phases: the dyeing bath; and substrate. In reactive dyes, the primary purpose of these reactions is the immobilization of the water soluble ions or molecules by formation of covalent bonds with functional groups of the substrate. Often times during the dyeing process, dyes may precipitate out upon the addition of salt and alkali. The search is ongoing for new coupling components which offer improved solubility in the production of fiber reactive dyes.

SUMMARY OF THE INVENTION

The present invention is directed to bis-pyridone compounds as shown in formula (1)

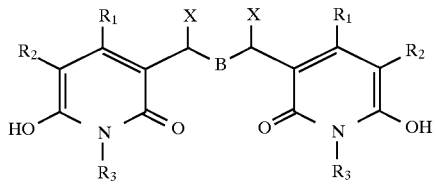

where $R_1$ and $R_3$ are each independently selected from: hydrogen; an alkyl group having from one to four carbon atoms; the foregoing alkyl group further substituted with one or more groups selected from: hydroxy; sulfo; halogen; an aryl radical; a heterocyclic radical; or combination thereof. Where for $R_3$ the amino group maybe further substituted by a nitrogen heterocyclic fiber reactive group of the series: 1, 3, 5 mono or dichloro triazinyl; 1,3,5 mono or difluoro triazinyl; trichloropyrimidinyl; difluoropyrimidinyl; or monochlorodifluoro pyrimidinyl; where the nitrogen heterocycle may be further substituted by an: alkyl; or aryl amino group. $R_2$ is a removable substituent selected from: CN; $CONH_2$; or $CO_2R$ where R is a hydrogen or an alkyl group having from one to six carbon atoms. B is selected from: a $C_2$ to $C_4$ alkyl chain; a substituted aryl; or a heterocyclic radical. X is selected from: $SO_3H$; $SO_3Na$; or a hydroxy group.

This invention also provides a process for preparing a bis-pyridone comprising the steps of: providing an unsubstituted pyridone, as shown in formula (2)

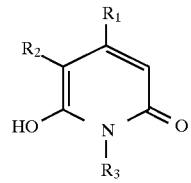

where $R_1$, $R_2$ and $R_3$ are as previously defined; providing a bridge compound having the structure as shown in formula (2A)

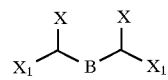

where X and B are as previously defined, and $X_1$ is selected from: $SO_3H$; $SO_3Na$; or a hydroxy group, and reacting the unsubstituted pyridone with the bridge compound in water; and forming the product (shown in formula 1). The product, i.e., formula 1 is useful in the preparation of fiber-reactive dyes as shown in formula 3

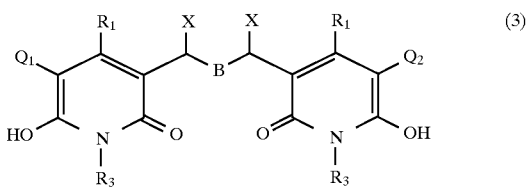

where $Q_1$ and $Q_2$ are independently selected from diazo components.

DETAILED DESCRIPTION OF THE INVENTION

The present invention is directed to bis-pyridone compounds and a method of preparation of the bis-pyridone compounds. The bis-pyridone compounds are useful in the preparation of fibers reactive dyes and as a component of fiber reactive dyes. More particularly, these bis-pyridones can be described as shown in formula (1)

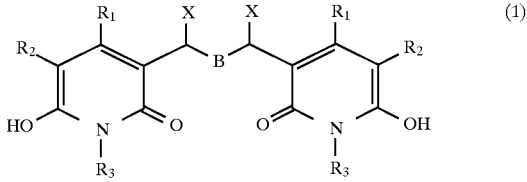

where $R_1$ and $R_3$ are each independently selected from: hydrogen; an alkyl group having from one to four carbon atoms; the foregoing alkyl group further substituted with one or more groups selected from: hydroxy; amino; sulfo; halogen; an aryl radical; a heterocyclic radical; or combination thereof. Where for $R_3$ the amino group maybe further substituted by a nitrogen heterocyclic fiber reactive group of the series: 1, 3, 5 mono or dichloro triazinyl; 1,3,5 mono or difluoro triazinyl; trichloropyrimidinyl; difluoropyrimidinyl; or monochlorodifluoro pyrimidinyl; where the nitrogen heterocycle may be further substituted by an: alkyl; or aryl amino group. $R_2$ is a removable substituent selected from: CN; $CONH_2$; or $CO_2R$ where R is a hydrogen of an alkyl group having from one to six carbon atoms. Removable substituent means a chemical group capable of being removed from a ring without affecting any of the other attached groups. B is selected from: a $C_2$ to $C_4$ alkyl chain; a substituted aryl; or a heterocyclic radical. X is selected from $SO_3H$, $SO_3Na$ or a hydroxy group.

The sulphoalkyl-6-hydroxy-pyrid-(2)-ones may exist in several tautomeric forms. In order to simplify the description, the compounds are illustrated in only one of these tautomeric forms. However, the description both here and hereinafter always refers to these compounds in any of these tautomeric forms.

This invention also provides a process for preparing a bis-pyridone comprising the steps of providing an unsubstituted pyridone, as shown in formula (2)

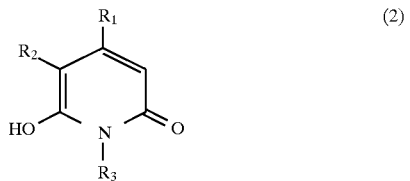

where $R_1$ and $R_3$ are each independently selected from: a hydrogen atom; an alkyl group having from one to four carbon atoms; the foregoing alkyl group further substituted with one or more groups selected from: hydroxy; amino; sulfo; halogen; an aryl radical; a heterocyclic radical; or combination thereof. Where for $R_3$ the amino group maybe further substituted by a nitrogen heterocyclic fiber reactive group of the series: 1, 3, 5 mono or dichloro triazinyl; 1,3,5 mono or difluoro triazinyl; trichloropyrimidinyl; difluoropyrimidinyl; or monochlorodifluoro pyrimidinyl; where the nitrogen heterocycle may be further substituted by an: alkyl; or aryl amino group. $R_2$ is a removable substituent selected from: CN; $CONH_2$; or $CO_2R$; wherein R is a hydrogen of an alkyl group having from one to six carbon atoms.

Providing a bridge compound having the structure as shown in formula (2a)

where X and B are as previously defined, and $X_1$ is selected from: $SO_3H$; $SO_3Na$; or a hydroxy group, and providing water and a reaction vessel.

An example of a bridge compound is a bisulphite addition compound of a di-aldehyde, e.g., 1,5-sodium bisulphite-1, 5-biglutarol, having a structure as shown in formula 2b.

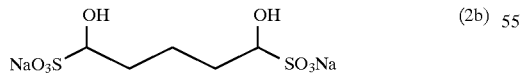

In the present process water is added to a reaction vessel. The unsubstituted pyridone, shown in formula 2, is added to the water. Then a bridge compound e.g. a bisulphite addition compound of a di-aldehyde, is added to the solution. Resulting admixture is then heated which speeds up the reaction of the unsubstituted pyridone and the bridge compound. The unsubstituted pyridone attaches to the reactive sites, of the bridge compound, at the number 3 position, as shown in formula 2c.

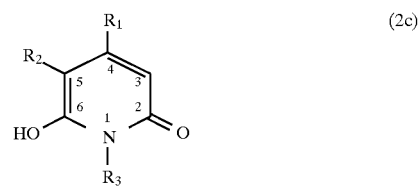

This reaction results in the compound shown in formula 1.

The pyridone is in solid form and can be mixed with water to form a slurry. This resulting slurry has a low pH value. To solubilize the rest of the pyridone, the pH is raised to a range of 4.5 to 6.0. In order to achieve the proper range of pH the pH of the slurry needs to be raised. An effective way to raise the pH of the slurry is the addition of a base, e.g. sodium carbonate. The bridge compound, which is soluble in the solution can then be added.

In water the unsubstituted pyridone reacts with the bridge compound at an elevated temperature. The reaction temperature should be greater than 35° C. Preferably, the reaction temperature should range from 45° to 65° C.

The reaction is carried out in a slightly acidic solution, having a pH ranging from 4.5 to 6.0. The pH of the solution is controlled with a base. Some exemplary bases include, but are not limited to, sodium hydroxide, potassium carbonate, lithium carbonate and sodium carbonate. Carbonate bases can optionally be used with a sodium citrate buffer.

Upon completion of the reaction the resulting product is separated through the removal of the starting components. Removal may be accomplished by lowering the pH of the solution. Lowering the pH results in the precipitation of any unreacted starting compounds out of solution. pH maybe lowered by the addition of an acid. The unreacted starting compounds are filtered off. Then, the filtrate is collected for preparation of fiber reactive dyes.

Fiber-reactive dyes as shown in formula (3) may be prepared from product (1)

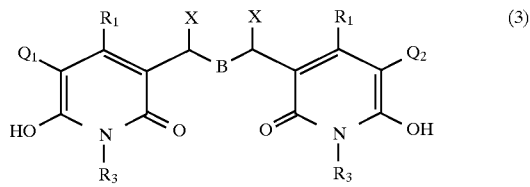

where $Q_1$ and $Q_2$ are independently selected from diazo components.

An example of fiber reactive dyes can be further described as having a diazo component having a structure as shown in formula (4)

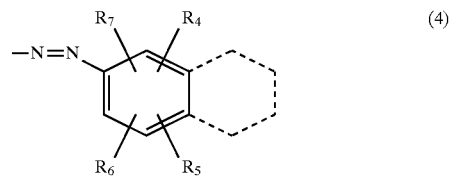

where the diazo component has both an azo group and a phenyl or naphthal group. $R_6$ is selected from hydrogen, or $SO_3H$. $R_7$ is selected from hydrogen, halogen or $SO_2X_a$ where $X_a$ is selected from —CH=$CH_2$ or —$CH_2$—$CH_2$—Z, where Z is a hydroxyl group, an inorganic radical or organic radical capable of being split off by the action of an alkaline reagent. $R_4$ and $R_5$ are independently selected from: hydrogen; a $C_1$ to $C_4$ alkyl; $C_1$ to $C_4$ alkoxy; carboxy; hydroxy; chloro; bromo; fluoro; or an amino group which maybe further substituted by a nitrogen heterocyclic fiber reactive group of the series, 1, 3, 5 mono or dichloro triazinyl, 1,3,5 mono or difluoro triazinyl, trichloropyrimidinyl, difluoropyrimidinyl, or monochlorodifluoro pyrimidinyl, the nitrogen heterocycle may be further substituted by an alkyl or aryl amino above.

Addition of the diazo groups representative of structure 4 yields a fiber reactive dye having a structure as shown in formulas (5)

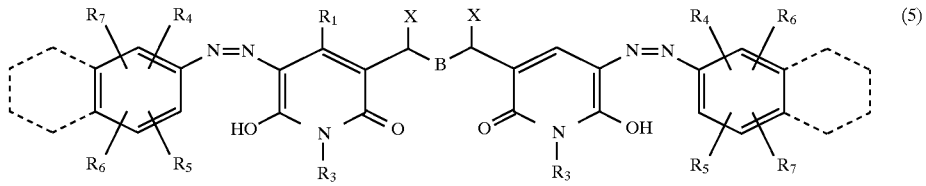

The structure of the coupling component of the present invention incorporates advantages over the prior art. For example, this coupling agent includes a bridge, whereby two solubilizing groups are incorporated in the dyestuff molecule by one condensation reaction. Not only does the bridge enhance solubility through the sulfonic acid moieties present, but it also provides a new way to incorporate two mono-reactive dyes producing one larger dye with improved levels of fixation. In the case of the aliphatic bridge, such as the glutaraldehyde bisulphite condensation product, the fixation properties should be further enhanced. The improved solubility should make these new dyes less prone to precipitate out of solution upon the introduction of salt and alkali. Further, the bridge links two reactive chromophoric systems together which should in theory provide greater tinctorial strength.

EXAMPLES

The following examples illustrate the invention, the parts and percentages are by weight unless stated otherwise.

Example 1

19.6 parts of N-ethylpyridone were dissolved in 100 parts water at pH 5.0–5.5 by the addition of 10.2 parts of potassium carbonate. 15.4 parts of glutaraldehyde sodium bisulphite addition product were added and the reaction was stirred for 5–6 hours at 50°–60° C. The reaction was cooled to 5°–10° C., and acidified to Congo Red by the addition of 110 parts by volume of concentrated hydrochloric acid, After 1 hour, a small amount of crystallized starting material was filtered off. The residual was used direct for coupling.

Example 2

28.1 parts of Aniline-4-[(2-sulfoxyethyl) sulfone] was diazotized in cold dilute aqueous hydrochloric acid with 17.8 parts of a 40% aqueous solution of sodium nitrite (5°–15° C.). The resulting diazonium salt solution was added to the previously prepared bis-pyridone solution (Example 1) which had been adjusted to a pH of 5.0–5.5 by the addition of 13.5 parts of sodium carbonate. The pH was maintained at 5.9–5.5 during the course of the reaction with 10.0 parts sodium carbonate. The solution was evaporated in an air oven at 30° C. to yield 78 parts of a yellow powder which dyed cellulose in a brilliant greenish-yellow shade.

Example 3

The following dyestuff was prepared by the method described above on a similar scale, except that 2-methoxy-5-methyl-aniline-4 [(2-suloxyethyl) sulfone] replaced the Aniline-4-[(2-sulfoxyethyl) sulfone]. The solution was evaporated in an air oven at 60° C. to yield 63 parts of a yellow powder which dyed cellulose in a brilliant yellow shade.

Example 4

The following dyestuff was prepared by the method described above on a similar scale, except that 2-methoxy-5-methyl-aniline-4[(2-suloxyethyl) sulfone] replaced the Aniline-4-[(2-sulfoxyethyl) sulfone]. The solution was evaporated in an air oven at 60° C. to yield 97.5 parts of a yellow powder which dyed cellulose in a brilliant yellow shade.

Example 5

The following dyestuff was prepared by the method described above except that 2,5-dimethoxy-aniline-4[(2-sulfoxyethyl) sulfone] replaced the Aniline-4-[(2-sulfoxyethyl) sulfone]. The solution was evaporated in an air oven at 60° C. to yield 87 parts of an yellow powder which dyed cellulose in a brilliant yellow shade.

Example 6

The following dyestuff was prepared by the method described above on a similar scale, except that 1-sulfo-2-diazo-naphthalene-6-(2-sulfoxyethyl)sulfone replaced the Aniline-4-[(2-sulfoxyethyl) sulfone]. The solution was evaporated in an air oven at 60° C. to yield 87 parts of a yellow powder which dyed cellulose in a brilliant yellow shade.

Further illustrative examples of the invention are shown in Table 1

TABLE 1

| Ex | Diazo Component | Coupling Component | Shade |
|----|-----------------|-------------------|-------|
| 7 | 2-aminophenol-5-[(2-sulfooxyethyl)sulfone]/Copper | (structure) | brown |
| 8 | (structure with SO₃H, N=N, Cl, triazine, NH-C₆H₄-SO₂C₂H₄OSO₃H) | (structure) | yellow |
| 9 | (structure with SO₃H, HO₃S, N=N, Cl, triazine, NH-C₆H₄-SO₂C₂H₄OSO₃H) | (structure) | yellow |
| 10 | (structure with SO₃H, N=N, NHCN, triazine, NH-C₆H₄-SO₂C₂H₄OSO₃H) | (structure) | yellow |
| 11 | (structure with SO₃H, N=N, difluoropyrimidine) | (structure) | yellow |

TABLE 1-continued

| Ex | Diazo Component | Coupling Component | Shade |
|----|-----------------|--------------------|-------|
| 12 | 2-aminophenol-5-[(2-sulfooxyethyl)sulfone]/Copper | | yellow |
| 13 | | | yellow |
| 14 | | | yellow |
| 15 | | | yellow |

What is claimed is:

1. A fiber reactive dye having the formula

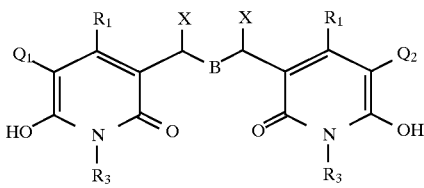

wherein $R_1$ and $R_3$ are independently selected from the group consisting of; hydrogen; an alkyl group having from one to four carbon atoms; the foregoing alkyl group further substituted with one or more groups selected from hydroxy; amino; sulfo; halogen; an aryl radical; a heterocyclic radical or combination thereof; where for $R_3$ said amino group maybe further substituted by a nitrogen heterocyclic fiber reactive group of the series: 1, 3, 5 mono or dichloro triazinyl; 1, 3, 5 mono or difluoro triazinyl; trichloropyrimidinyl; difluoropyrimidinyl; or monochlorodifluoro pyrimidinyl; where the nitrogen heterocycle may be further substituted by an: alkyl; or aryl amino group;

wherein B is selected from the group consisting of a $C_2$ to $C_4$ alkyl chain; a substituted aryl or a heterocyclic radical;

wherein X is selected from the group consisting of $SO_3H$; $SO_3Na$ or a hydroxy group; and wherein $Q_1$ and $Q_2$ are independently selected from diazo components.

2. The fiber reactive dye according to claim 1 wherein $Q_1$ has different structure from $Q_2$.

3. The fiber reactive dye according to claim 1 wherein $Q_1$ and $Q_2$ have the same structure.

4. The fiber reactive dye according to claim 1 wherein $Q_1$ and $Q_2$ have the formula

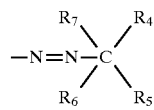

D' is a phenyl or naphthyl group, wherein $R_4$ and $R_5$ are independently selected from the group consisting of: hydrogen; a $C_1$ to $C_4$ alkyl; $C_1$ to $C_4$ alkoxy; carboxy; hydroxy; chloro; bromo; fluoro; or an amino group which maybe further substituted by a nitrogen heterocyclic fiber reactive group of the series, 1, 3, 5 mono or dichloro, triazinyl 1, 3, 5 mono or difluoro triazinyl, trichloropyrimidinyl, difluoropyrimidinyl, or monochlorodifluoro pyrimidinyl, the nitrogen heterocycle may be further substituted by an alkyl or aryl amino above;

wherein $R_6$ is selected from the group consisting of hydrogen or $SO_3H$; and wherein $R_7$ is selected from the group consisting of hydrogen or $SO_2X_a$ wherein $X_a$ is selected from the group consisting of $-CH=CH_2$ or $-CH_2-CH_2-Z$, where Z is a hydroxyl group, an inorganic radical or organic radical capable of being split off by the action of an alkaline reagent.

5. The fiber reactive dye according to claim 1 wherein said diazo components have the formula

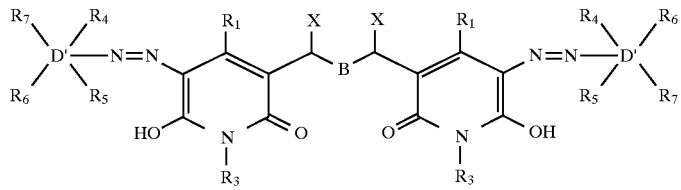

D' is a phenyl or naphthyl group;

wherein $R_4$ and $R_5$ are independently selected from the group consisting of: hydrogen; a $C_1$ to $C_4$ alkyl; $C_1$ to $C_4$ alkoxy; carboxy; hydroxy; chloro; bromo; fluoro; or an amino group which maybe further substituted by a nitrogen heterocyclic fiber reactive group of the series, 1, 3, 5 mono or dichloro triazinyl, 1, 3, 5 mono or difluoro triazinyl trichloropyrimidinyl, difluoropyrimidinyl, or monochlorodifluoro pyrimidinyl, the nitrogen heterocycle may be further substituted by an alkyl or aryl amino above.

wherein $R_6$ is selected from the group consisting of hydrogen or $SO_3H$; and wherein $R_7$ is selected from the group consisting of hydrogen or $SO_2X_a$ wherein $X_a$ is selected from the group consisting of $-CH=CH_2$ or $-CH_2-CH_2-Z$, wherein Z is a hydroxyl group, an inorganic radical or organic radical capable of being split off by the action of an alkaline reagent.

6. A fiber reactive dye according to claim 1 further comprising:

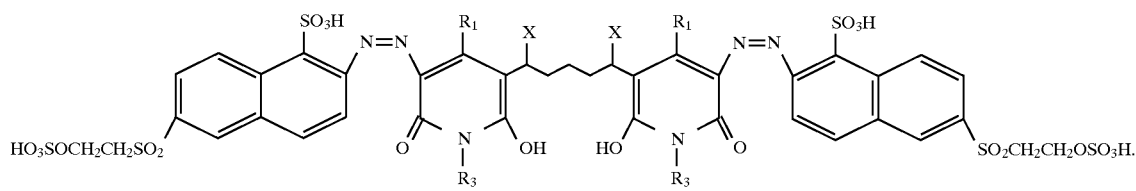

7. A fiber reactive dye according to claim 1 further comprising:
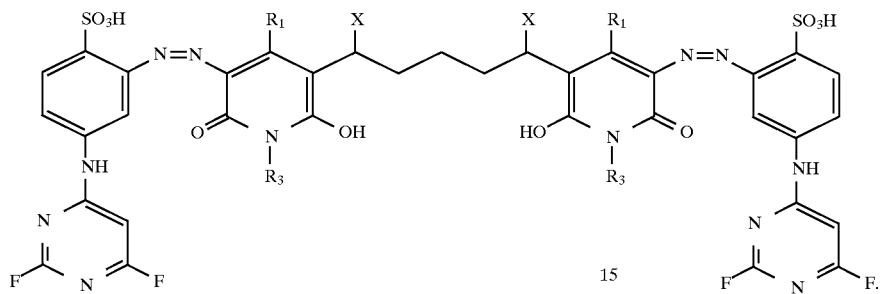
8. A fiber reactive dye according to claim 1 further comprising:
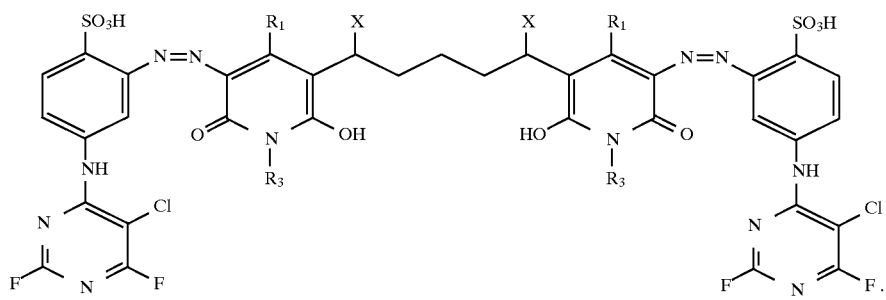
* * * * *

UNITED STATES PATENT AND TRADEMARK OFFICE
CERTIFICATE OF CORRECTION

PATENT NUMBER: 5,811,529

ISSUE DATE: September 22, 1998

INVENTOR(S): DANETTE R. VINES, ET AL.

It is certified that errors appear in the above-identified patent and that said Letters Patent is hereby corrected as shown below:

In column 11, claim 4, please delete the formula, and insert the following formula --

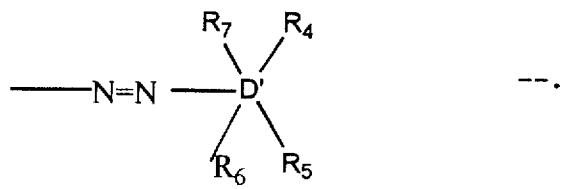

-- .

Signed and Sealed this

Sixteenth Day of February, 1999

Attest:

*Attesting Officer*

*Acting Commissioner of Patents and Trademarks*